US006886877B1

(12) United States Patent
Plavetich et al.

(10) Patent No.: US 6,886,877 B1
(45) Date of Patent: May 3, 2005

(54) VEHICLE WITH TAILGATE

(75) Inventors: Richard Plavetich, Laguna Beach, CA (US); Gary J. Ragle, Huntington Beach, CA (US); David E. Harris, Fountain Valley, CA (US)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/747,105

(22) Filed: Dec. 30, 2003

(51) Int. Cl.[7] .......................................... B62D 33/023
(52) U.S. Cl. ................ 296/57.1; 296/26.04; 296/186.3
(58) Field of Search ...................... 296/57.1, 50, 26.01, 296/26.04, 26.05, 186.3, 186.4

(56) References Cited

U.S. PATENT DOCUMENTS

| | | | |
|---|---|---|---|
| 3,010,760 A | | 11/1961 | Trautmann |
| 4,580,828 A | | 4/1986 | Jones |
| 4,951,991 A | * | 8/1990 | Haigler ..................... 296/26.09 |
| 5,110,172 A | * | 5/1992 | Ney et al. ..................... 296/50 |
| 5,468,038 A | * | 11/1995 | Sauri ........................ 296/571.1 |
| 6,095,587 A | * | 8/2000 | Shirlee et al. .......... 296/100.07 |
| 6,276,738 B1 | * | 8/2001 | Marshall ..................... 296/57.1 |
| 6,364,392 B1 | * | 4/2002 | Meinke ........................ 296/62 |
| 6,367,858 B1 | * | 4/2002 | Bradford ................. 296/26.09 |
| 6,454,338 B1 | * | 9/2002 | Glickman et al. .......... 396/57.1 |
| 6,464,276 B1 | * | 10/2002 | Gruich ....................... 296/37.6 |
| 6,464,278 B2 | | 10/2002 | Bailey |
| 6,513,863 B1 | * | 2/2003 | Renke et al. ........... 296/190.11 |
| 2002/0074817 A1 | * | 6/2002 | Bailey ......................... 296/57.1 |
| 2002/0074821 A1 | * | 6/2002 | Pyo ............................. 296/106 |

* cited by examiner

Primary Examiner—Patricia L. Engle
(74) Attorney, Agent, or Firm—Birch, Stewart, Kolasch & Birch, LLP

(57) ABSTRACT

There is provided a vehicle with a tailgate, which can be provided in a variety of vehicles without being restricted by e.g., the sizes of the vehicles, thus considerably improving usability. The tailgate is comprised of a first tailgate having one end thereof mounted on the rear end of a bed, and a second tailgate extending from the other end of the first tailgate. A tailgate telescoping device drives the second tailgate to move in a direction toward the one end of the first tailgate.

18 Claims, 4 Drawing Sheets

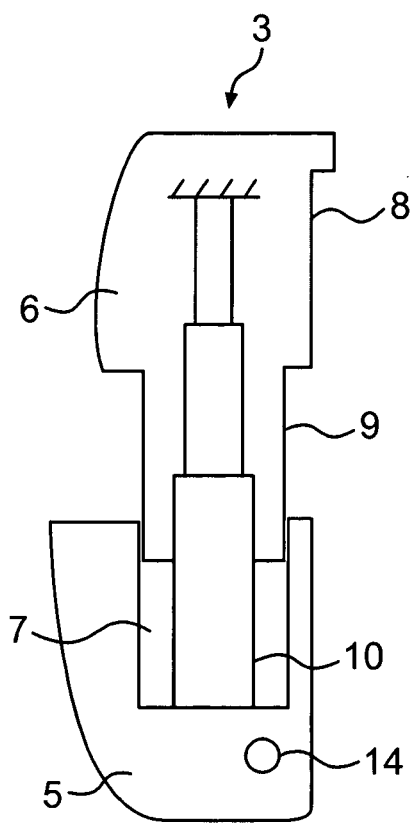
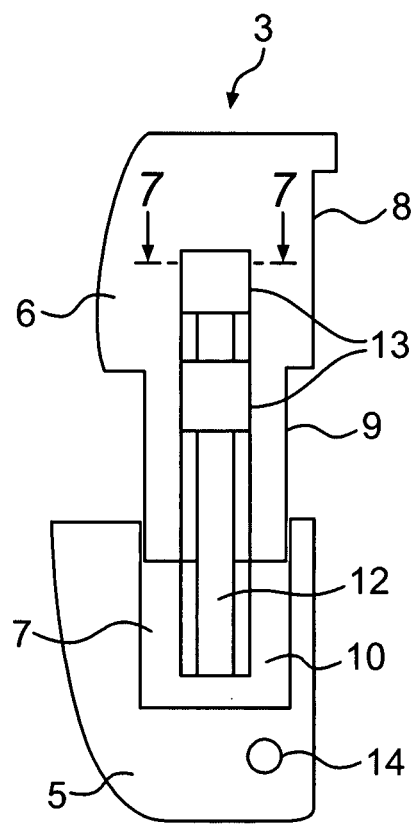
FIG. 5   FIG. 6
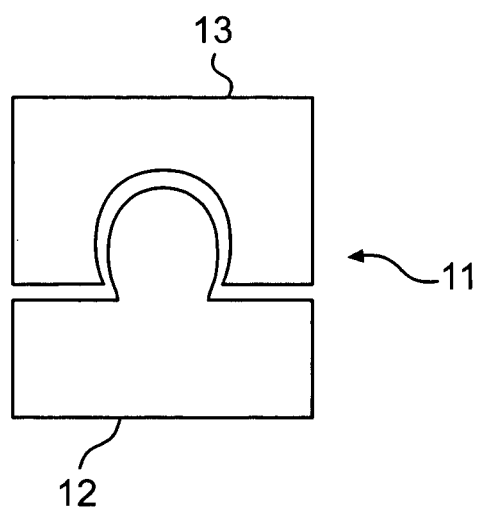
FIG. 7

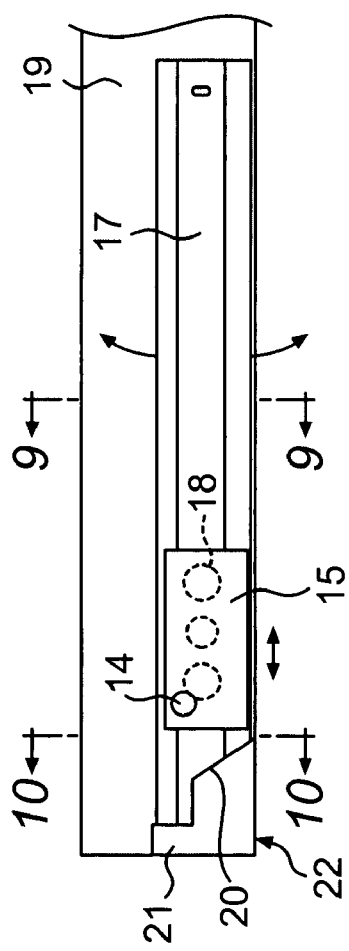
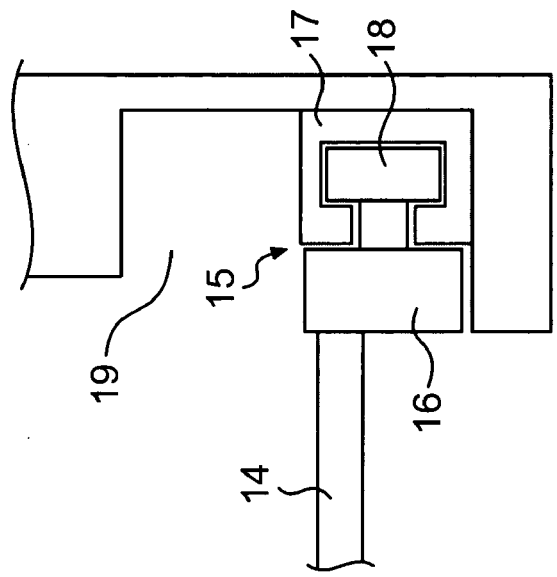

US 6,886,877 B1

VEHICLE WITH TAILGATE

BACKGROUND OF THE INVENTION

1. Field of the Invention

The present invention relates to a vehicle with a tailgate, and more particularly to a tailgate for a pickup truck, a station wagon, and a van, and so forth.

2. Description of the Related Art

Generally, at the rear of a bed in a vehicle such as a pickup truck or a station wagon, a tailgate constituting a rear wall of the bed is provided. The tailgate is pivotally supported by a floor of the bed or right and left side-walls of the bed. When closed, the tailgate stands upright to form the rear wall of the bed, and when opened, the tailgate extends outwardly and horizontally as a rearward extension of the floor of the bed.

However, if the vehicle runs with the bed empty and the tailgate closed, the air resistance increases and consequently the fuel economy deteriorates. In this case, maintaining the tailgate open would suppress an increase in the air resistance, but due to rearward protrusion of the tailgate, the driver must be careful when parking the vehicle.

To solve these problems, there has been developed a technique which houses the tailgate under the bed as disclosed in U.S. Pat. No. 4,580,828 and U.S. Pat. No. 6,464,278.

According to the above technique, however, a space having a length corresponding to the height of the tailgate must be provided under the bed, and a suspension for rear wheels is disposed in a lower part of the vehicle at the rear of the bed. Therefore, it is difficult to secure such a space unless the vehicle has a sufficient rear overhang.

SUMMARY OF THE INVENTION

It is therefore an object of the present invention to provide a vehicle with a tailgate, which can be provided in a variety of vehicles without being restricted by e.g., the size of the vehicles, thus considerably improving the usability.

To attain the above object, there is provided a vehicle with a tailgate which comprises a first tailgate with one end thereof mounted on a rear end of a bed, a second tailgate extending from the other end of the first tailgate, and a tailgate telescoping device that drives the second tailgate to move in a direction toward the one end of the first tailgate.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein:

FIG. 5 is a partially sectional view showing an actuator part which extends and telescopes the tailgate shown in FIG. 1;

FIG. 6 is a partially sectional view showing a guide part which is used for extending and telescoping the tailgate shown in FIG. 1;

FIG. 7 is a partially sectional view taken in the direction of an arrow VII—VII shown in FIG. 6;

FIG. 8 is a partially sectional view showing a rail on a side of a vehicle body, the rail being used for taking the tailgate shown in FIG. 1 into and out of a retracting space under the floor of the bed;

FIG. 9 is a partially sectional view taken in the direction of an arrow IX—IX shown in FIG. 8;

DETAILED DESCRIPTION OF THE INVENTION

Figure 1:
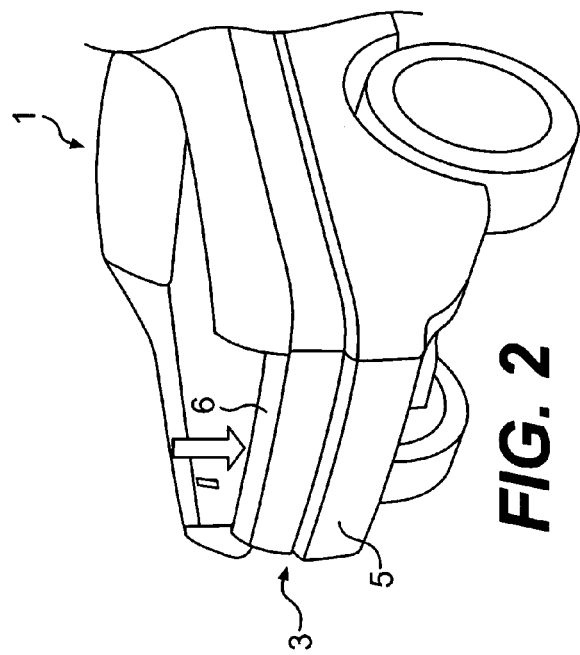
FIG. 1 is a rear perspective view showing a state in which a tailgate of a vehicle according to an embodiment of the present invention is closed in extended state.

The present invention will now be described in detail with reference to FIGS. 1 to 12 showing preferred embodiments thereof.

In FIGS. 1 to 4, reference numeral 1 denotes a pickup truck; 2, a bed; and 3, a tailgate.

FIG. 1 illustrates the pickup truck 1 as viewed from the rear. The tailgate 3 is provided at the rear end of the bed 2. When positioned at the rear end of the bed 2, the tailgate 3 is pivotally supported by lower parts of right and left side walls 4 of the bed so that the tailgate 3 can be tilted from an upright position, in which it closes the bed 2, to a flat position, in which it opens the bed 2.

The tailgate 3 is comprised of a first tailgate 5 positioned in a lower part when closed, and a second tailgate 6 positioned in an upper part when closed.

As shown in FIG. 5, a space (a recess) 7 is formed inside the first tailgate 5. On the other hand, the second tailgate 6 is comprised of a bulged part 8, which is positioned in an upper part and having a bulged portion bulging in the direction of the length of the vehicle in the state in which the tailgate 3 is closed, and a downward telescoping part 9 (extending part), which can be selectively inserted into the space 7 formed inside the first tailgate 5. At the center of the tailgate 3 in the direction of the vehicle width, a first linear actuator 10 (a tailgate telescoping device), having one end thereof fixed to the first tailgate 5 and the other end thereof fixed to the second tailgate 6, is disposed.

Figure 2:
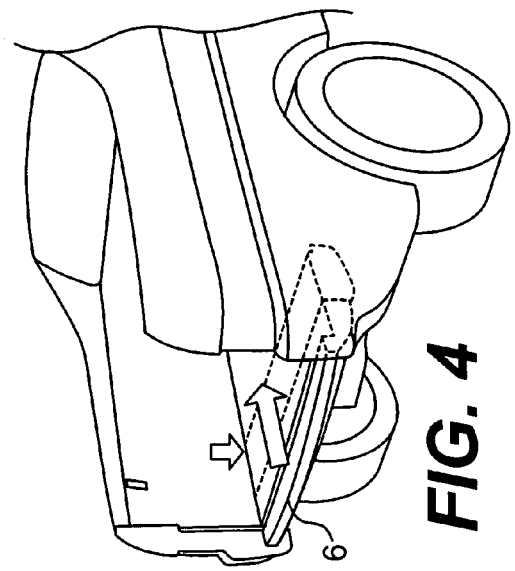
FIG. 2 is a rear perspective view showing a state in which the tailgate shown in FIG. 1 is closed in telescoped state.

Further, as shown in FIGS. 6 and 7, linear bearings 11 are provided at both ends of the tailgate 3 in the direction of the vehicle width. Guide rails 12 constituting the linear bearing 11 are fixed to the first tailgate 5, while bearings 13 constituting the linear bearings 11 are fixed to the second tailgate 6. The downward telescoping part 9 of the second tailgate 6 guided by the linear bearings 11 due to retraction by the first linear actuator 10 is retracted in the space 7 formed inside the first tailgate 5, such that the length of the tailgate 3 in the direction of the shorter side thereof (vertical direction in a closed state) can be shortened. By operation of the first linear actuator 10, the state of the tailgate 3 can be arbitrarily switched between a state in which the height of the tailgate 3 is equal to the height of the right and side walls 4 of the bed 2 as shown in FIG. 1 and a state in which the downward telescoping part 9 of the second tailgate 6 is fully retracted in the space 7 of the first tailgate 5 to telescope the tailgate 3 to the utmost extent as shown in FIG. 2.

It should be noted that the front surface of the bulged part 8 of the second tailgate 6 in the direction of the length of the vehicle is made to be level with the front surface of the first tailgate 5 in the direction of the length of the vehicle when the tailgate 3 is closed, and hence when the tailgate 3 is telescoped to the utmost extent, the front surface of the tailgate 3 in the direction of the length of the vehicle is substantially flat.

Figure 10:
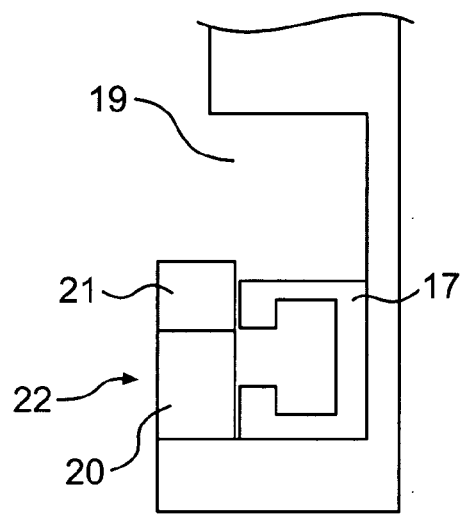
FIG. 10 is a partially sectional view taken in the direction of an arrow X—X shown in FIG. 8.

Shafts 14 are provided in lower parts of the right and left sides of the tailgate 3 in the closed state. As shown in FIG. 8, the shafts 14 are rotatably supported by bearing blocks 15. As shown in FIG. 9, the bearing blocks 15 are each comprised of a supporting part 16, which rotatably supports the shaft 14, and a roller part 18, which slides within a bearing rail 17. As shown in FIGS. 8 and 9, the bearing rail 17 has one end thereof pivotally supported by each of groove parts 19 formed at right and left ends of the lower part of the bed 2 such that the bearing rail 17 can rotate about the pivot. As shown in FIG. 10, a bearing block stopper 22, having a tilted surface 20 tilted diagonally rearward and a projection 21, is fixed to the groove part 19 close to an end of the groove part 19 in the rear of the vehicle body.

When the bearing block 15 moves along the bearing rail 17 toward the rear of the vehicle body, the supporting part 16 of the bearing block 15 comes into contact with the tilted surface 20 and then moves upward along the tilted surface 20 with the rotation of the bearing rail 17 until the supporting part 16 comes into contact with the projection 20. It should be noted that the bearing block 15 is moved forward and backward via a ball screw, which is disposed in the groove part 19 and is actuated by a motor, not shown, connected to the bearing block 15.

Figure 11:
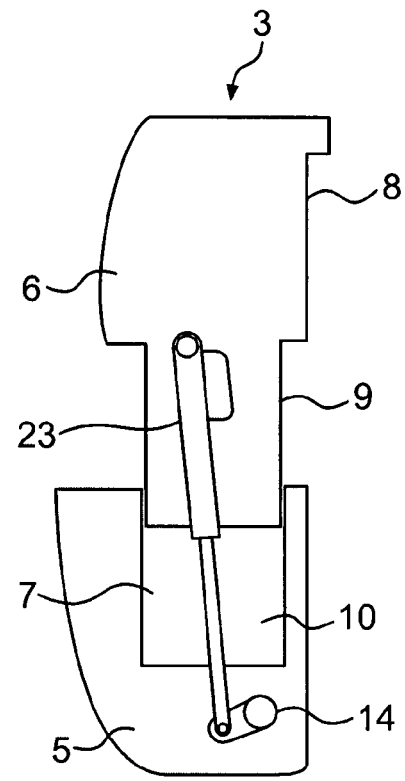
FIG. 11 is a partially sectional view showing a device which tilts the tailgate shown in FIG. 1 to an upright position and a flat position.
Figure 12:
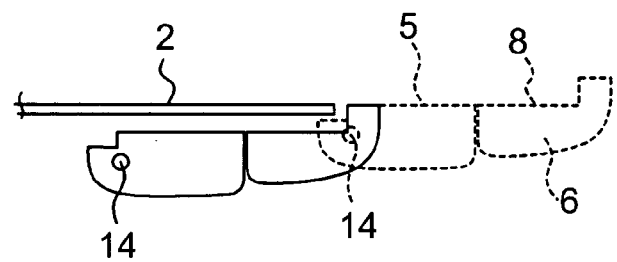
FIG. 12 is a sectional view showing essential parts in a state in which the tailgate shown in FIG. 1 is retracted under a floor of the bed, and a state in which the tailgate in FIG. 1 is extended horizontally at the rear of the bed.

Further, as shown in FIG. 11, the tailgate 3 is provided with a second linear actuator 23 which has one end thereof connected to the shaft 14 and the other end thereof connected to the first tailgate 5. The expansion and contraction of the second linear actuator 23 causes the tailgate 3 to rotate about the shaft 14. Further, the shaft 14 is provided with a stopper, not shown, which inhibits the tailgate 3 from tilting toward the inside of the bed 2 when the tailgate stands upright, and inhibits the tailgate 3 from tilting downward when the tailgate 3 is extended horizontally.

The tailgate 3 with the second tailgate 6 being extended to the utmost extent as shown in FIG. 1 can be reduced in height by contracting the first linear actuator 10 to retract the downward telescoping part 9 of the second tailgate 6 into the first tailgate 5 as shown in FIG. 2 due to contraction of the first linear actuator 10. In this way, in the state in which the tailgate 3 is telescoped, a longer luggage or the like can be loaded on the bed 2, the rearward visibility can be improved, and the air resistance can be reduced although the tailgate 3 is closed, as compared with the state in which the tailgate 3 is extended.

Figure 3:
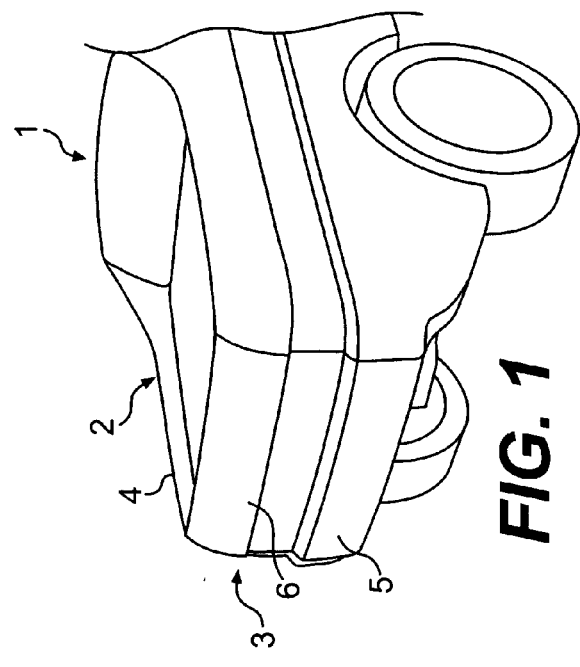
FIG. 3 is a rear perspective view showing a state in which the tailgate shown in FIG. 1 is opened in telescoped state.

The tailgate 3 closed while being telescoped to the utmost extent as shown in FIG. 2 is caused to rotate about the shafts 14 at the lower end toward the rear of the vehicle body by contraction of the second linear actuator 23. The tailgate 3 is rotated to a position where the upper surface thereof can be substantially flat as shown in FIG. 3 (a position restricted by the stopper). The upper surface of the tailgate 3 having made substantially flat is level with the floor of the bed 2. In this case, since the tailgate 3 is telescoped, the tailgate 3 projects only slightly rearward from the vehicle body, hence an extra parking space is not required, and the driver can easily back up the vehicle. Moreover, the air resistance can be reduced when the vehicle is driven with the tailgate 3 being opened. Further, since the upper surface of the bed 2 is level with the upper surface of the tailgate 3, and the tailgate 3 projects only slightly rearward, it is possible to easily take a luggage on or off of the bed 2. It should be noted that the tailgate 3 can be rotated even in extended state, and the tailgate 3 can be stopped at a desired position between the flat position and the upright position by operation of the second linear actuator 23.

It should be noted that when the tailgate 3 lies in the states shown in FIGS. 1 to 3, the rearward movement of the bearing block 15 is restricted since it is in contact with the projection 21 of the bearing block stopper 22 (a downward moving device) at the rear end of the vehicle. At the same time, the bearing block 15 has passed over the tilted surface 20 of the bearing stopper 22, and hence the bearing rail 17 is pushed up toward the upper side of the groove part 19 via the roller part 18 of the bearing block 15.

Figure 4:
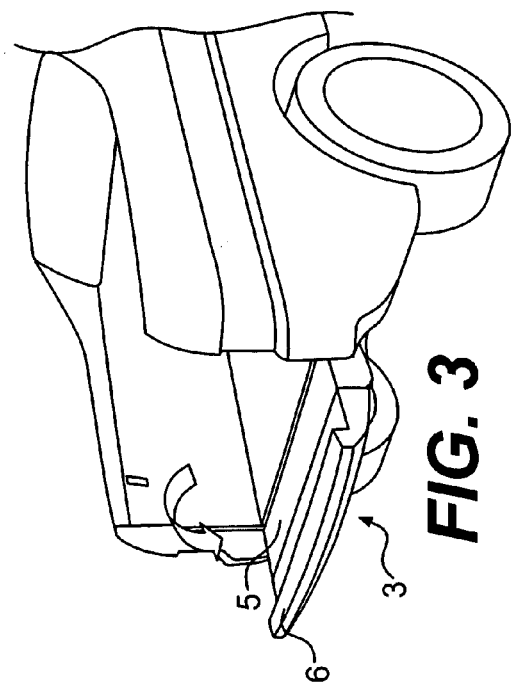
FIG. 4 is a rear perspective view showing a state in which the tailgate shown in FIG. 1 is retracted under a bed in telescoped state.

In the state in which the telescoped tailgate 3 is extended horizontally as shown in FIG. 3, the upper surface of the tailgate 3 is lowered to be under the floor of the bed 2 by actuating the ball screw to move the bearing block 15 toward the front of the vehicle body to thus cause the bearing block 15 as well as the bearing rail 17 to lower along the tilted surface 20 of the bearing block stopper 22 until the bearing rail 17 is supported by the lower side of the groove part 19. Then, the telescoped tailgate 3 is retracted in a tailgate retracting part provided under the floor of the bed 2 as shown in FIG. 4. Causing the bearing block 15 supporting the shafts 14 of the tailgate 3 to get on and off the tilted surface 20 of the bearing block stopper 22 can change the position of the tailgate 3 in the vertical direction according to the position of the bearing block 15 in the direction of the length of the vehicle. Therefore, in the case where the tailgate 3 is positioned at the rear end of the vehicle, closing the tailgate 3 in the extended state can close the bed 2 while the upper surface of the tailgate 3 is level with the right and left side walls 4 of the bed 2, and when the tailgate 3 is opened, the floor of the bed 2, the first tailgate 5, and the bulged part 8 of the second tailgate 6 can be level with each other as indicated by dotted lines in FIG. 12. When the tailgate 3 moves forward, the tailgate 3 lowers to be retracted in the tailgate retracting part without causing the upper surface thereof from interfering with the floor of the bed 2. Further, since the tailgate 3 is retracted in telescoped state (i.e. the state in which the tailgate 3 has been reduced in length in the direction of the length of the vehicle) under the floor of the bed 2, even in case of a vehicle with no extra space under the rear part of the bed 2, such as a vehicle whose rear overhung is small, can employ the above described arrangement in which the tailgate 3 is retracted under the floor of the bed 2. Further, when the tailgate 3 is retracted, it projects only slightly rearward from the vehicle body, and hence there is no need for extra space for parking, the driver can easily back the vehicle, and the rearward visibility can be improved. In addition, the air resistance can be suppressed when the vehicle is driven with the tailgate 3 being retracted.

The tailgate 3 is extended and telescoped by actuation of the first linear actuator 10, opened and closed by actuation of the second linear actuator 23, and retracted by actuation of the ball screw. The actuators may be controlled by operating switches in a vehicle compartment, bed 2, or remote controller to extend or telescope, open or close, and retract the tailgate 3.

Further, a vehicle speed detecting device may be connected to controllers for the respective actuators of the tailgate 3 so that the actuators can be controlled such that the tailgate 3 is telescoped (or extended horizontally or retracted) when the detected vehicle speed becomes equal to or higher than a predetermined speed. In this case, the air resistance can be reduced.

Further, the actuators may be controlled such that the tailgate 3 is telescoped (or extended horizontally or retracted) when a shift position detecting device detects the backward movement of the vehicle. In this case, the rearward visibility can be improved, making it easer to back the vehicle.

Although in the above described embodiment, the tailgate 3 is extended or telescoped, opened or closed, and retracted under the control of the actuators, but may be extended or telescoped, opened or closed, and retracted by manual control without using the actuators.

Further, although in the above described embodiment, the pickup truck was taken as an example, the present invention may also be applied to a variety of vehicles such as a station wagon insofar as it has a tailgate capable of spreading out horizontally.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle with a tailgate, comprising:
   a first tailgate with one end thereof mounted on a rear end of a bed, said bed having side-walls;
   a second tailgate extending from the other end of said first tailgate, said first tailgate and said second tailgate together forming said tailgate, which acts as a rear-wall of said bed; and
   a tailgate telescoping device that drives said second tailgate to move in a direction toward the one end of said first tailgate, such that the length of said tailgate, along the dimension that is vertical when said tailgate is closed, is substantially shorter than the height of said side-walls.

2. A vehicle with a tailgate according to claim 1, wherein said second tailgate is disposed in such a way as to extend from said first tailgate, and
   said tailgate telescoping device retracts part of said second tailgate into said first tailgate.

3. A vehicle with a tailgate according to claim 2, wherein said first tailgate has the one end thereof mounted on the rear end of the bed such that said first tailgate is capable of being horizontally oriented, and
   said second tailgate comprises an extending part that extends from said first tailgate and is retracted in said first tailgate, and a bulged part that has a surface exposed externally when said extending part is retracted, such that the surface is level with an upper surface of said first tailgate oriented horizontally.

4. A vehicle with a tailgate according to claim 3, further comprising:
   a tailgate retracting part formed under the bed of the vehicle; and
   a tailgate retracting device that retracts said first and second tailgates, while horizontally oriented, toward a front of the vehicle under the bed.

5. A vehicle with a tailgate according to claim 4, wherein said tailgate retracting device includes,
   a downward moving device that causes an upper surface of the tailgate to extend horizontally to be level with a floor of the bed when the tailgate is positioned at the rear end, and moves the tailgate downward when moving the tailgate toward the front of the vehicle.

6. A vehicle with a tailgate according to claim 1, further comprising:
   a vehicle speed detecting device that detects vehicle speed; and
   a controller that controls said tailgate telescoping device according to the vehicle speed detected by said vehicle speed detecting device.

7. A vehicle with a tailgate according to claim 6, wherein said controller controls said second tailgate to telescope inward in said first tailgate when said vehicle speed detecting device detects that the vehicle speed exceeds a predetermined speed.

8. A vehicle with a tailgate according to claim 1, further comprising:
   a shift position detecting device that detects a shift position of the vehicle; and
   a controller that controls said tailgate telescoping device according to the vehicle shift position detected by said shift position detecting device.

9. A vehicle with a tailgate according to claim 8, wherein said controller controls said second tailgate to telescope inward in said first tailgate when said shift position detecting device detects the reverse gear position.

10. A vehicle with a tailgate, comprising:
    a first tailgate with one end thereof mounted on a rear end of a bed;
    a second tailgate extending from the other end of said first tailgate, said first tailgate and said second tailgate together forming said tailgate, wherein said tailgate has a solid rear surface when said second tailgate is extended fully relative to said first tailgate; and
    a tailgate telescoping device that drives said second tailgate to move in a direction toward the one end of said first tailgate.

11. A vehicle with a tailgate according to claim 10, wherein
    said second tailgate is disposed in such a way as to extend from said first tailgate, and
    said tailgate telescoping device retracts part of said second tailgate into said first tailgate.

12. A vehicle with a tailgate according to claim 11, wherein
    said first tailgate has the one end thereof mounted on the rear end of the bed such that said first tailgate is capable of being horizontally oriented, and
    said second tailgate comprises an extending part that extends from said first tailgate and is retracted in said first tailgate, and a bulged part that has a surface exposed externally when said extending part is retracted, such that the surface is level with an upper surface of said first tailgate oriented horizontally.

13. A vehicle with a tailgate according to claim 12, further comprising:
    a tailgate retracting part formed under the bed of the vehicle; and
    a tailgate retracting device that retracts said first and second tailgates, while horizontally oriented, toward a front of the vehicle under the bed.

14. A vehicle with a tailgate according to claim 13, wherein said tailgate retracting device includes,
    a downward moving device that causes an upper surface of the tailgate to extend horizontally to be level with a floor of the bed when the tailgate is positioned at the rear end, and moves the tailgate downward when moving the tailgate toward the front of the vehicle.

15. A vehicle with a tailgate according to claim 10, further comprising:
   a vehicle speed detecting device that detects vehicle speed; and
   a controller that controls said tailgate telescoping device according to the vehicle speed detected by said vehicle speed detecting device.

16. A vehicle with a tailgate according to claim 15, wherein said controller controls said second tailgate to telescope inward in said first tailgate when said vehicle speed detecting device detects that the vehicle speed exceeds a predetermined speed.

17. A vehicle with a tailgate according to claim 10, further comprising:
   a shift position detecting device that detects a shift position of the vehicle; and
   a controller that controls said tailgate telescoping device according to the vehicle shift position detected by said shift position detecting device.

18. A vehicle with a tailgate according to claim 17, wherein said controller controls said second tailgate to telescope inward in said first tailgate when said shift position detecting device detects the reverse gear position.

* * * * *